(12) United States Patent
Otvagin et al.

(10) Patent No.: US 9,467,460 B1
(45) Date of Patent: Oct. 11, 2016

(54) MODULARIZED DATABASE ARCHITECTURE USING VERTICAL PARTITIONING FOR A STATE MACHINE

(71) Applicant: FireEye, Inc., Milpitas, CA (US)

(72) Inventors: Alexander Otvagin, Campbell, CA (US); Vineet Kumar, San Jose, CA (US); Arsen Movsesyan, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 14/580,501

(22) Filed: Dec. 23, 2014

(51) Int. Cl.
*H04L 29/06* (2006.01)
*G06F 17/30* (2006.01)

(52) U.S. Cl.
CPC ......... *H04L 63/14* (2013.01); *G06F 17/30091* (2013.01)

(58) Field of Classification Search
CPC .......................... H04L 63/14; G06F 17/30091
USPC ....................................................... 726/3, 23
See application file for complete search history.

(56) References Cited

U.S. PATENT DOCUMENTS

| 7,028,228 | B1* | 4/2006 | Lovy | G06F 11/3495 714/47.2 |
| 7,962,382 | B1* | 6/2011 | Tancredi | G06Q 20/02 705/30 |
| 8,370,931 | B1* | 2/2013 | Chien | G06F 11/3072 709/224 |
| 2008/0126376 | A1* | 5/2008 | Leff | G06F 8/65 |
| 2014/0187177 | A1* | 7/2014 | Sridhara | G06N 5/043 455/73 |
| 2014/0298027 | A1* | 10/2014 | Roberts | H04L 9/0869 713/171 |

* cited by examiner

*Primary Examiner* — Michael S McNally
(74) *Attorney, Agent, or Firm* — Cesari and McKenna, LLP

(57) ABSTRACT

A modularized architecture using vertical partitioning of a database is configured to store object metadata and processing results of one or more objects analyzed by a state machine, such as an analysis engine of a malware detection system. The database may include a plurality of data structures, such as one or more master blocks, state sub-blocks, and state co-tables, as well as state transition queues. The modularized architecture may organize the database as one or more stages of a state machine, wherein each stage includes a state sub-block, a state co-table and a state transition queue. The modularized architecture may further organize the database such that each stage corresponds to an action, i.e., module, of the state machine on the object. The module may process the data structures of its corresponding stage such that a state sub-block receives information from its state transition queue, wherein the module generates results that are stored in its associated state co-table, which then provides information for a next stage.

20 Claims, 8 Drawing Sheets

MODULARIZED DATABASE ARCHITECTURE USING VERTICAL PARTITIONING FOR A STATE MACHINE

BACKGROUND

1. Technical Field

The disclosure relates to malware detection systems and, more specifically, to a modularized database architecture using vertical partitioning for a state machine of a malware detection system.

2. Background Information

A prior approach to analyzing potential malicious software (malware) involves use of a malware detection system configured to examine content of an object, such as a web page, email, file or universal resource locator, and rendering of a malware/non-malware classification based on previous analysis of that object. The malware detection system may include an analysis engine having one or more stages of analysis, e.g., static analysis and/or behavioral analysis, of the object. The static analysis stage may be configured to detect anomalous characteristics of the object to identify whether the object is "suspect" and deserving of further analysis or whether the first object is non-suspect (i.e., benign) and not requiring further analysis. The behavioral analysis stage may be configured to process (i.e., analyze) the suspect object to arrive at the malware/non-malware classification based on observed anomalous behaviors.

The observed behaviors (i.e., analysis results) for the suspect object may be recorded in an object cache that may be accessible via an object identifier (ID) that is generated for the object. The object cache may be organized as a single data structure (e.g., a large table) having a plurality of entries or rows, each of which represents metadata of an object, and a plurality of columns, each of which represents an attribute of the object metadata. The rows of the cache may be configured to store updates, such as insertions and deletions, of the object metadata, which may include constant metadata (such as an object ID and size of object) as well as behavioral metadata (such as states associated with the object).

Use of the single table to accommodate such updates may adversely impact performance of the object cache, particularly when a large number of rows (i.e., object metadata) are regularly modified (i.e., updated) triggering frequent garbage collection. That is, a number (e.g., M) of rows transitioning through another number (e.g., N) of updates (i.e., states) yields a much larger number (e.g., M×N) of dirty rows requiring garbage collection. As a result, the overall performance of the object cache degrades. In addition, use of the single table may suffer from a loss of object metadata (i.e., information in the rows) as updates occur overwriting existing metadata (i.e., the dirty rows are reclaimed).

Further, performance is also impacted where two or more processes attempt to access, e.g., read, write and/or overwrite, the object metadata of the rows concurrently. To improve performance, the rows of the table may be copied (i.e., shadow copied) to additional (unused) rows of the table to accommodate the concurrent accesses. As a result, subsequent read accesses of the object metadata may be directed to the shadow copies pending synchronization with the original row (and garbage collection of the shadow copy). In addition, a number of states associated with the object may increase as the object metadata is analyzed (e.g., behavioral analysis), thereby requiring the insertion of yet more rows into the object cache to capture information associated with each state. However, multiple updates to the object metadata (i.e., row insertion, column updates, and garbage collection) and concomitant contention may adversely impact performance of the system. Moreover, as the object metadata of each row transitions through various states during the analysis, there may be overwrite of one or more attributes of the object metadata. Therefore, in addition to the adverse performance impact (from inserting, copying and garbage collection), the use of the single table may suffer from a loss of information (i.e., object metadata) as the states transition.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
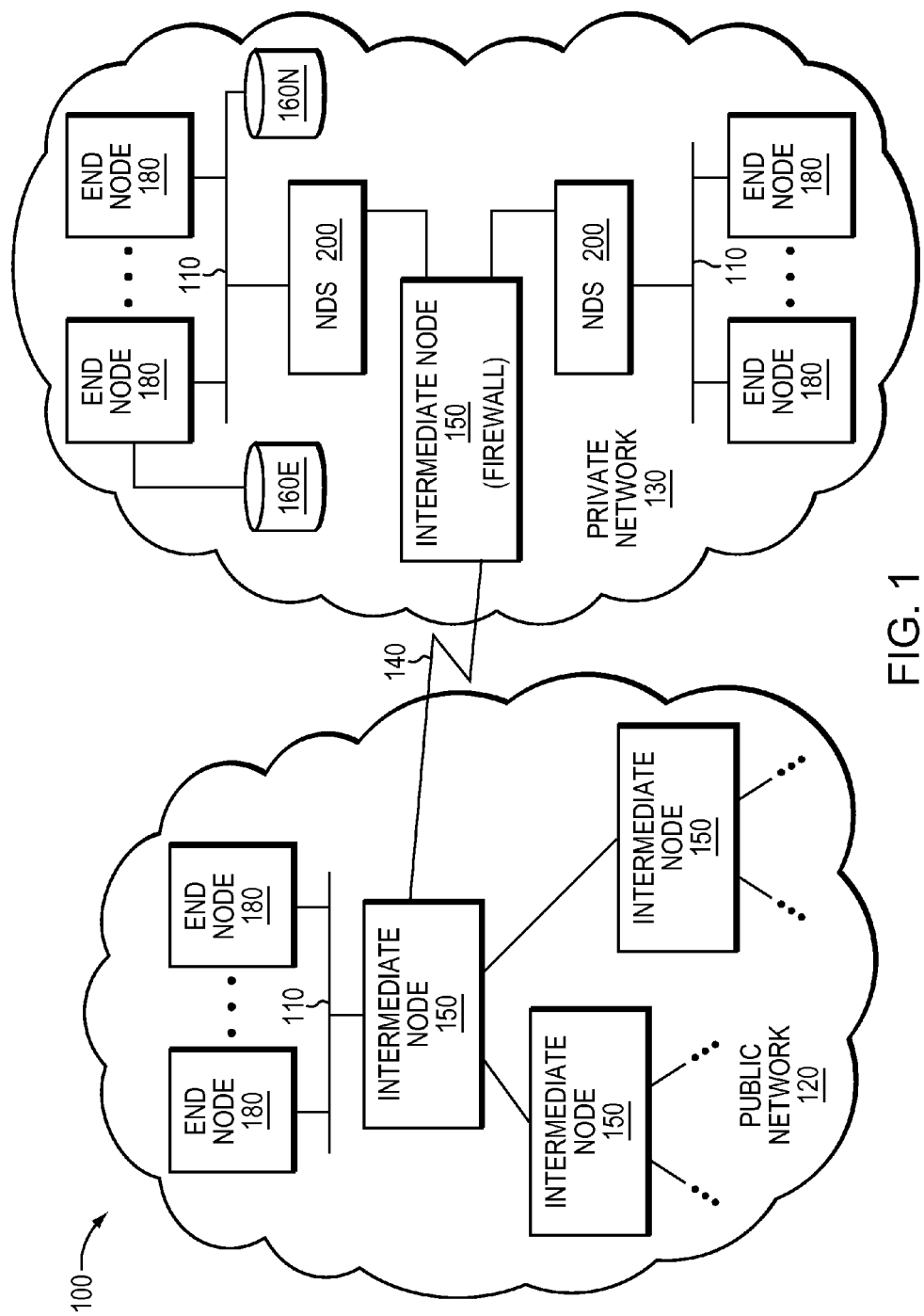
FIG. 1 is a block diagram of a network environment that may be advantageously used with one or more embodiments described herein.

The embodiments herein provide a modularized architecture using vertical partitioning of an analysis database configured to store information, such as object metadata, of one or more objects processed by a state machine, such as an analysis engine of a malware detection system to generate processing results. The analysis database may include a plurality of vertical data structures, such as one or more master blocks (i.e., object tables), state sub-blocks, and state co-tables, as well as state transition queues. The modularized architecture may illustratively organize (i.e., partition) the analysis database vertically into a plurality of stages, wherein each stage includes a state sub-block, a state co-table and a state transition queue. The modularized architecture may further organize the database such that each stage corresponds to a process (i.e., execution of a module) of the state machine (e.g., analysis engine operating on the object). Notably, each module may operate (i.e., perform an action) on the object metadata stored in data structures corresponding to the object and generate (via the action) the processing results that may be stored in its associated state co-table, which then provides information for a next stage. Invocation of the next stage (i.e., performance of the next stage action) occurs via an action request inserted into the state transition queue of the next stage. The transition may be dependent on completion (and results) of one or more prior stages. That is, the next stage may have a dependency on the one or more prior stages that provide input (i.e., prior stage results) for execution of the next stage action. In an embodiment, dependency logic associated with each stage may determine whether the dependency is satisfied and, if so, may insert an action request into the state transition queue for the next stage to invoke the action associated with that stage.

Illustratively, an object table containing initial state metadata (e.g., object identifier and object hash) of an object may be vertically partitioned into one or more master blocks. Each state sub-block may be configured to store object metadata needed for processing by the module (i.e., a corresponding action) of the state machine (e.g., analysis engine) and each state co-table may be configured to store results of the processing by the action. For example, the processing results may include analytical information, such as anomalous behaviors, associated with the object observed at an associated state. Note that the "co-table" denotes association of the state co-table with the master block of the object table such that the results stored in the state co-table may be accessible by reference, e.g., via an object identifier. Each state transition queue is configured to store action requests (e.g., insertions and deletions) for transitioning between the stages and, to that end, may be configured to leverage database primitives to, e.g., manipulate entries in the state transition queue and to update the state sub-block.

In an embodiment, the modularized architecture may include an object table storing metadata for each object, wherein the object table is initially of a small size or empty. Subsequently during processing of the object, the size of the object table may increase as appropriate state sub-blocks, state co-tables and state transition queues are instantiated and results from each stage are stored in their respective state co-table. As the object is processed, information associated with a state transition, e.g., stored in the state co-table for one or more previous stages of the database, may be used by a module (e.g., module of the analysis engine performing an action) associated with the next stage of the database. Notably, the action associated with a stage is performed when an action request is inserted into the state transition queue of that stage, e.g., directly by a previous stage and when the one or more dependencies of the stage are satisfied. Illustratively, the state transition queue may be embodied as a small, lightweight table configured to store information associated with a state transition, and may include dependencies for the transition between stages (and/or states). It is expressly contemplated that the embodiments described herein may include any overall operation (including business operations) which may be implemented as a state machine, such as gathering and delivery of mail (i.e., postal services).

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130 (i.e., customer network), such as an organization, enterprise, or personal network. The networks 120, 130 illustratively include a plurality of network links and segments connected to a plurality of nodes. The network links and segments may include local area networks (LANs) 110 and wide area networks (WANs) 140, including wireless networks, interconnected by intermediate nodes 150 to form an internetwork of nodes, wherein the intermediate nodes 150 may include network switches, routers and/or malware detection systems (MDSs 200) described further herein. The LANs 110 may, in turn, interconnect end nodes 180 which, in the case of private network 130, may be illustratively embodied as endpoints. The LANs may also include network storage 160N, while the end nodes embodied as endpoints may include endpoint storage 160E (e.g., disk drives, flash drives, removable media), which together constitute customer storage.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity. The nodes illustratively communicate by exchanging packets or messages (i.e., network traffic) according to a predefined set of protocols, such as the HyperText Transfer Protocol (HTTP), although other protocols may be advantageously used with the embodiments herein. In the case of private network 130, the intermediate node 150 may include a firewall or other network device configured to limit or block certain network traffic to protect the endpoints from unauthorized users.

Figure 2:
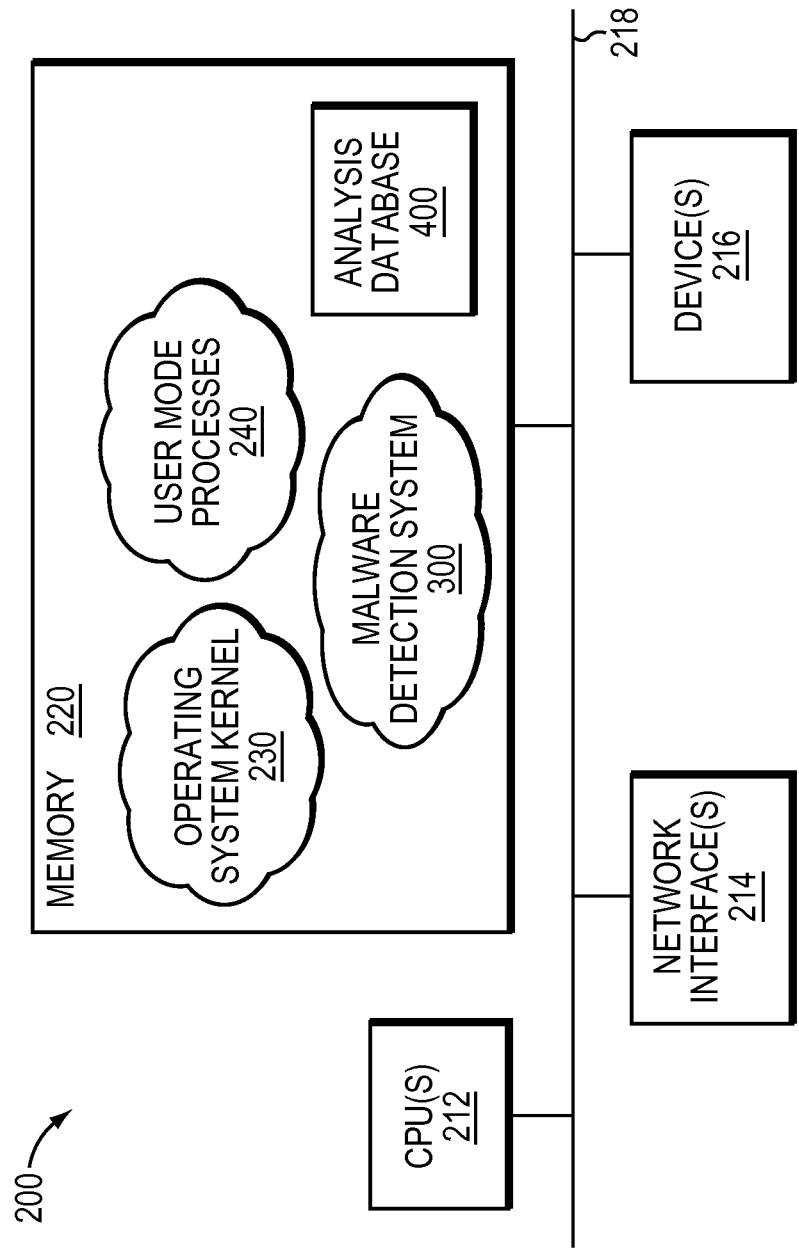
FIG. 2 is a block diagram of an intermediate node that may be advantageously used with one or more embodiments described herein.

FIG. 2 is a block diagram of an intermediate node that may be advantageously used with one or more embodiments described herein. The intermediate node is illustratively embodied as MDS 200 and includes one or more central processing units (CPUs) 212, a memory 220, one or more network interfaces 214 and one or more devices 216 connected by a system interconnect 218, such as a bus. The devices 216 may include storage devices (e.g., disks) and/or other types of input/output (I/O) or peripheral devices. Each network interface 214 may contain the mechanical, electrical and signaling circuitry needed to connect the node to the network 130 to thereby facilitate communication over the network. To that end, the network interface 214 may be configured to transmit and/or receive messages using a variety of communication protocols including, inter alia, HTTP.

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as malware detection system 300, and manipulate the data structures, e.g., organized as analysis database 400. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 (in-core) and executed by the CPU, functionally organizes the node by, inter alia, invoking operations in support of the application programs executing on the node. A suitable operating system kernel 230 may include the Windows® series of operating systems from Microsoft Corp of Redmond, Wash., the MAC OS® and iOS® series of operating systems from Apple Inc. of Cupertino, Calif., the Linux® operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the application programs may be implemented as user mode processes 240 of the kernel 230. As used herein, a process (e.g., a user mode process) is an instance of software program code (e.g., an application program) executing in the operating system that may be separated (decomposed) into a plurality of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code and computer, e.g., application, programs stored in memory, alternative embodiments also include the code/programs being embodied as modules consisting of hardware, software, firmware, or combinations thereof.

Figure 3:
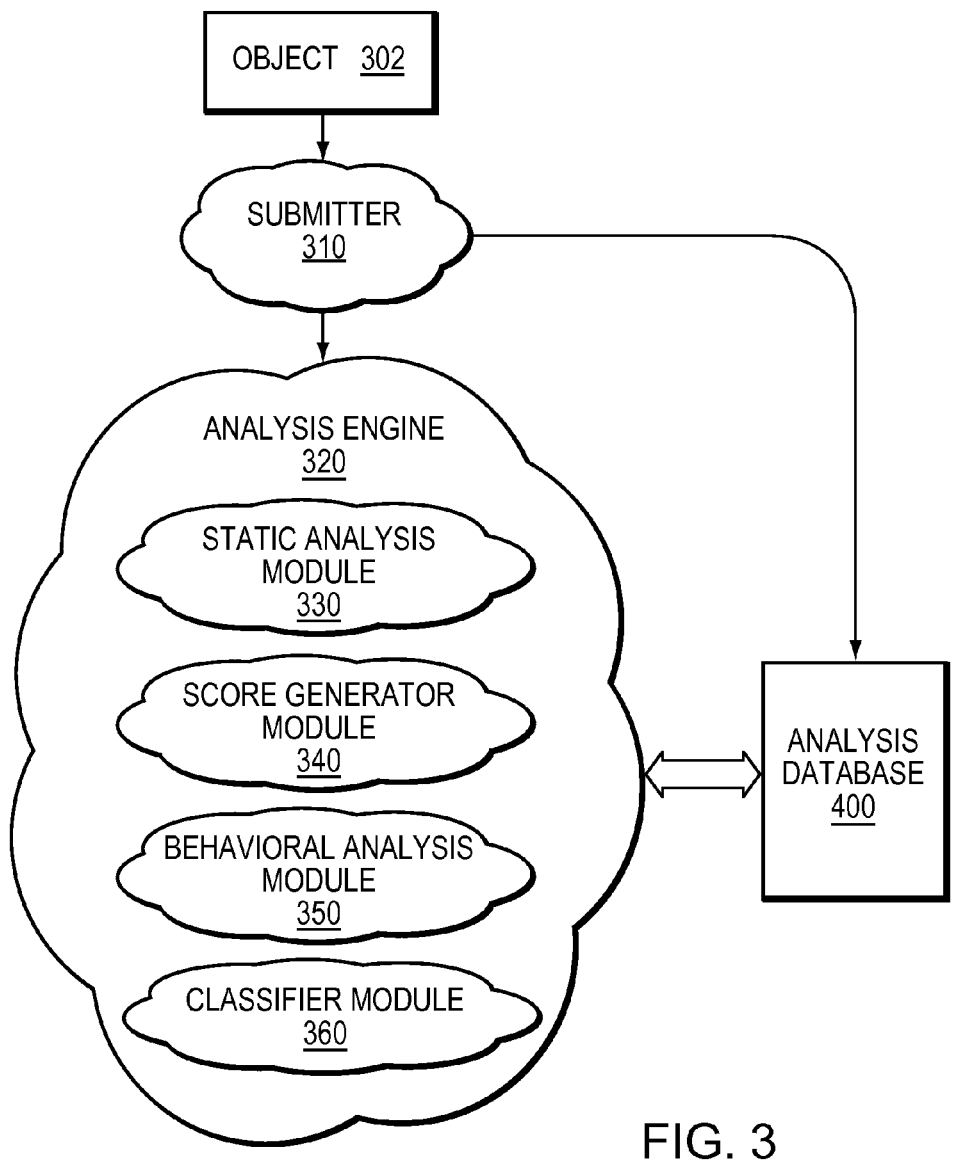
FIG. 3 is a block diagram of a malware detection system that may be advantageously used with one or more embodiments described herein.

FIG. 3 is a block diagram of a malware detection system that may be advantageously used with one or more embodiments described herein. The malware detection system 300 may include a submitter 310 and an analysis engine 320. In an embodiment, the submitter 310 may be embodied as a module containing computer executable instructions executed by the CPU 212 to examine a current object 302 (e.g., file, web page, universal resource locator, and/or email) provided to the system for analysis from customer storage (e.g., network storage 160N and/or endpoint storage 160E), HTTP payload/emails directed to an endpoint via the LAN 110 and/or other sources. In response to such examination, the submitter may decide whether it is appropriate to submit the current object 302 to the analysis engine 320. That is, the submitter 310 may be configured to identify whether the current object is suspicious. If so, the object may be sent to the analysis engine for further investigation. Illustratively, there is a submitter (and a NMS 200) for each type of "attack vector," i.e., mode of object ingress to the customer network (e.g., email, web, file storage, mobile). For the email attack vector, the submitter may extract a payload of the email (which may be an object, such as a file or URL) and send the object to the analysis engine 320. For a web attack vector, the submitter 310 may examine one or more packets (e.g., HTTP packets) and may extract a payload (which may be an object, such as a file or URL) and may send the object to the analysis engine 320. Each attack vector, the submitter may determine whether the object is non-suspect (i.e., benign) or "not sure", in which case the object is sent to the analysis engine.

In an embodiment, the analysis engine 320 may include a plurality of modules containing computer executable instructions executed by the CPU 212 to analyze the current object 302 to determine whether it is suspicious (i.e., malware). To that end, the analysis engine 320 may include a static analysis module 330, a score generator module 340, a behavioral analysis module 350, and a classifier module 360 to determine whether the object is suspicious. The current object 302 may be contained in any attack vector (e.g., file storage, an email or network content). The static analysis module 330 may be configured to detect anomalous characteristics of the current object 302 to identify whether the current object is "suspect" and deserving of further analysis or whether it is non-suspect (i.e., benign) and not in need of further analysis. The score generator module 340 may be configured to generate a score (i.e., figure of merit) denoting a degree of certainty that the object is malware. The behavioral analysis module 350 may be configured to process (i.e., analyze) the suspect current object to arrive at a malware/non-malware classification based on observed anomalous behaviors during processing of the suspect current object. The classifier module may be configured to determine whether the object is malicious (and categorize the activity) using pre-defined anomalous behaviors (monitored activity) of verified exploits and malware.

According to a prior approach, observed behaviors (i.e., analysis results) for previously analyzed objects may be recorded in, e.g., an object cache and indexed by an object identifier (ID) that is generated by, e.g., applying a hash function (such as MD5 or SHA-256 hash) to the object. During subsequent analysis of the current object, the cache may be searched using the object ID of the current object and compared with object IDs of previous objects to determine whether there is match. If there is a match, the current object may be deemed a "duplicate" object and further analysis may not be required. Rather, the recorded analysis results of the matching previously analyzed object may be used to either issue an alert if the current object is deemed malware (e.g., the matching object is classified as malware) or to take no action (simply direct analysis workflow to other objects) if the object is classified as benign.

As noted, the prior approach organized the object cache as a single data structure (e.g., a large table) having a plurality of entries or rows, each of which represented metadata of an object, and a plurality of columns, each of which represented an attribute of the object metadata. The rows of the cache were configured to store updates, such as insertions and deletions, of the object metadata, including constant metadata (such as an object ID and size of object) as well as behavioral metadata (such as states associated with the object). However, use of the single table to accommodate such updates adversely impacts performance, particularly where two or more entities attempt to (contend for) access, e.g., read, write and/or overwrite, the object metadata of the rows concurrently. Moreover, as the object metadata of each row transitions through various states during the analysis, there may be overwrite of certain attributes of the object metadata. Therefore, in addition to the adverse performance impact, the use of the single table may suffer from a loss of information (i.e., object metadata) as the states transition.

The embodiments herein provide a modularized architecture using vertical database partitioning of an analysis database configured to store information, such as object metadata, of one or more objects processed by a state machine, e.g., the analysis engine of the malware detection system to generate processing results. The database may include a plurality of vertical data structures, such as one or more master blocks, state sub-blocks, and state co-tables, as well as state transition queues. The modularized architecture may illustratively organize (i.e., partition) the database into a plurality of stages, wherein each stage includes a state sub-block, a state co-table and a state transition queue. The modularized architecture may further organize the database such that each stage corresponds to a process (i.e., execution of a module) of the overall operation (e.g., analysis engine operating on the object). Notably, the module may operate (i.e., perform an action) on the object metadata stored in data structures corresponding to the object and generate via the action (i.e., execution of the module) the processing results that are stored in the associated state co-table, which then provides information (e.g., at least a portion of the processing results) to a next stage. Invocation of the next stage (i.e., execution of a next stage action) may be dependent on completion (i.e., processing results) of one or more previous stages. That is, the next stage may have a dependency on the one or more prior stages that provide information for execution for the next stage action.

It is expressly contemplated that embodiments of the database architecture may include any overall operation (including business operations) which may be implemented as a state machine having one or more stages, e.g., gathering and delivery of mail. For example, assume such business operations are postal services. Each stage may represent an action of an overall postal operation (i.e., a state machine), such as gathering, sorting and delivery of mail. The state transition queue for each postal action may store a request to perform the action (e.g., gather, sort, deliver) associated with the stage on a piece of mail (i.e., an object). The state sub-block may record when processing (i.e., the action) by the stage on the object (piece of mail) began (e.g., start timestamp) and ended (e.g., end timestamp). Metadata about the piece of mail (e.g., addressee) may be recorded in the action output of the state co-table, which may be used by a next stage (e.g., sorting). The state machine (postal operation) progresses as the action of each stage is performed according to its dependency on the other stages. In typical postal operations, for instance, mail is first gathered, then sorted and finally delivered creating a simple pipeline dependency where delivery depends on sorting which, in turn, depends on gathering. As such, dependency logic associated with each stage may be used to control transition from stage to stage. That is, dependency logic associated with the postal sorting stage may wait for completion of mail gathering before invoking (i.e., inserting an action request in the state transition queue) the sorting action. Similarly, dependency logic associated with the delivery stage may wait for completion of the sorting stage before invoking the delivery action.

Figure 4:
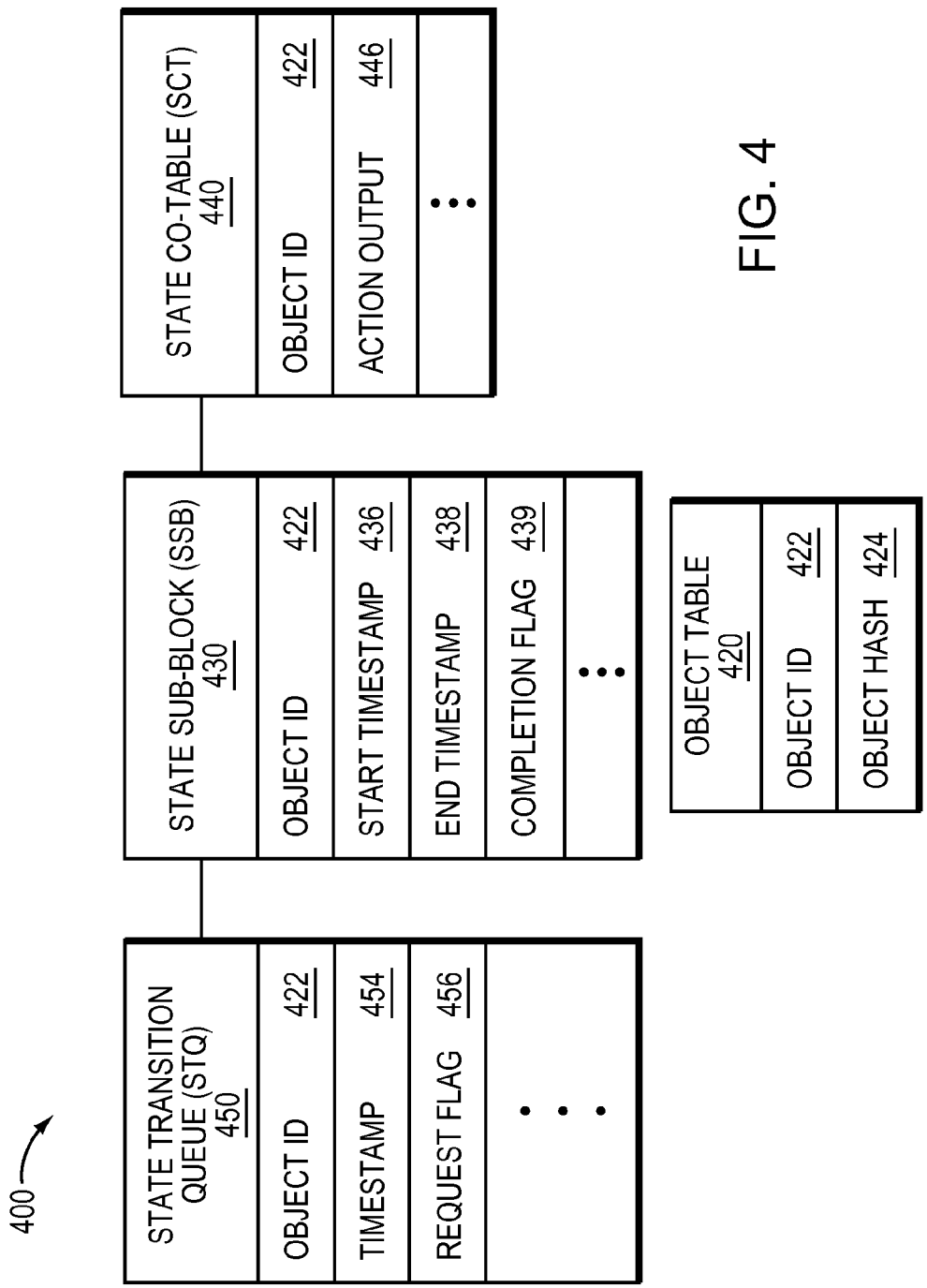
FIG. 4 is a block diagram of an exemplary analysis database that may be advantageously used with one or more embodiments described herein.

FIG. 4 is a block diagram of an exemplary analysis database 400 that may be advantageously used with one or more embodiments described herein. The analysis database 400 may include a plurality of data structures, such as one or more master blocks, state sub-blocks 430, and state co-tables 440, as well as state transition queues 450. Illustratively, each master block may be embodied an object table (OT) 420 containing initial state metadata, such as e.g., an object ID 422 and object hash 424 of an object. Each state sub-block (SSB) 430 may be configured to store object metadata needed for processing by the corresponding module of the analysis engine 320. In an embodiment, the modularized, multi-stage architecture of the analysis database 400 is a representation of the analysis engine 320. That is, vertical partitioning of the database into stages that track transitions between stages and store processing results at each stage may implement a state machine that represents the analysis engine 320. To that end, the object metadata stored at the SSB 430 may be constant metadata and may include, e.g., the object ID 422; a starting time-stamp 436 entering the stage; an ending timestamp 438 leaving the stage; and a status 439 indicating status of the completed action (i.e., processing by the module). Each state co-table (SCT) 440 may be configured to store results of the action as an action output 446, wherein the results, for example, may include analytical information, such as anomalous behaviors, associated with the object observed at an associated state. Note that the "co-table" denotes association of the state co-table 440 with the master block (and object table 420) such that the results stored in the state co-table 440 may be accessible by reference via from the object ID 422.

Each state transition queue (STQ) 450 may be configured to store updates (e.g., insertions and deletions) for transitioning between the stages of the state machine and, to that end, may be configured to leverage database primitives to, e.g., manipulate entries within the queue (i.e., action requests) to insert into the state sub-block. For example, the state transition queue 450 may store information such as the object ID 422; a timestamp 454 indicating when information was submitted to the queue 450, i.e., beginning of information; and an indication or request flag 456 specifying that an action request for processing by the stage was received by a module associated with the stage of the analysis engine 320. Dependency logic associated with each stage may be used to insert the action request into the STQ to thereby control transition from stage to stage. Alternatively, a prior stage may directly insert an action request into the STQ of a subsequent stage when no dependency on another stage exists, i.e., the subsequent stage depends only on the prior stage.

In an embodiment, the modularized architecture includes an object table 420 for each object, wherein the object table is initially of a small size. Subsequently during processing of the object, the size of the object table 420 may increase as appropriate state sub-blocks 430, state co-tables 440 and state transition queues 450 are instantiated and results from each stage are stored in their respective co-table. As the object is processed, information associated with a state transition, e.g., stored in the state co-table 440 for one or more previous stages of the analysis database 400, may be advanced (i.e., forwarded) by reference using the object ID in an action request to the state transition queue 450 associated with the next stage of the database. Such information may then be deleted from the state transition queue 450 associated with the previous stage. Accordingly, the state transition queue may be embodied as a small, lightweight table configured to store information associated with a state transition by reference (e.g., via the object ID).

Figure 5:
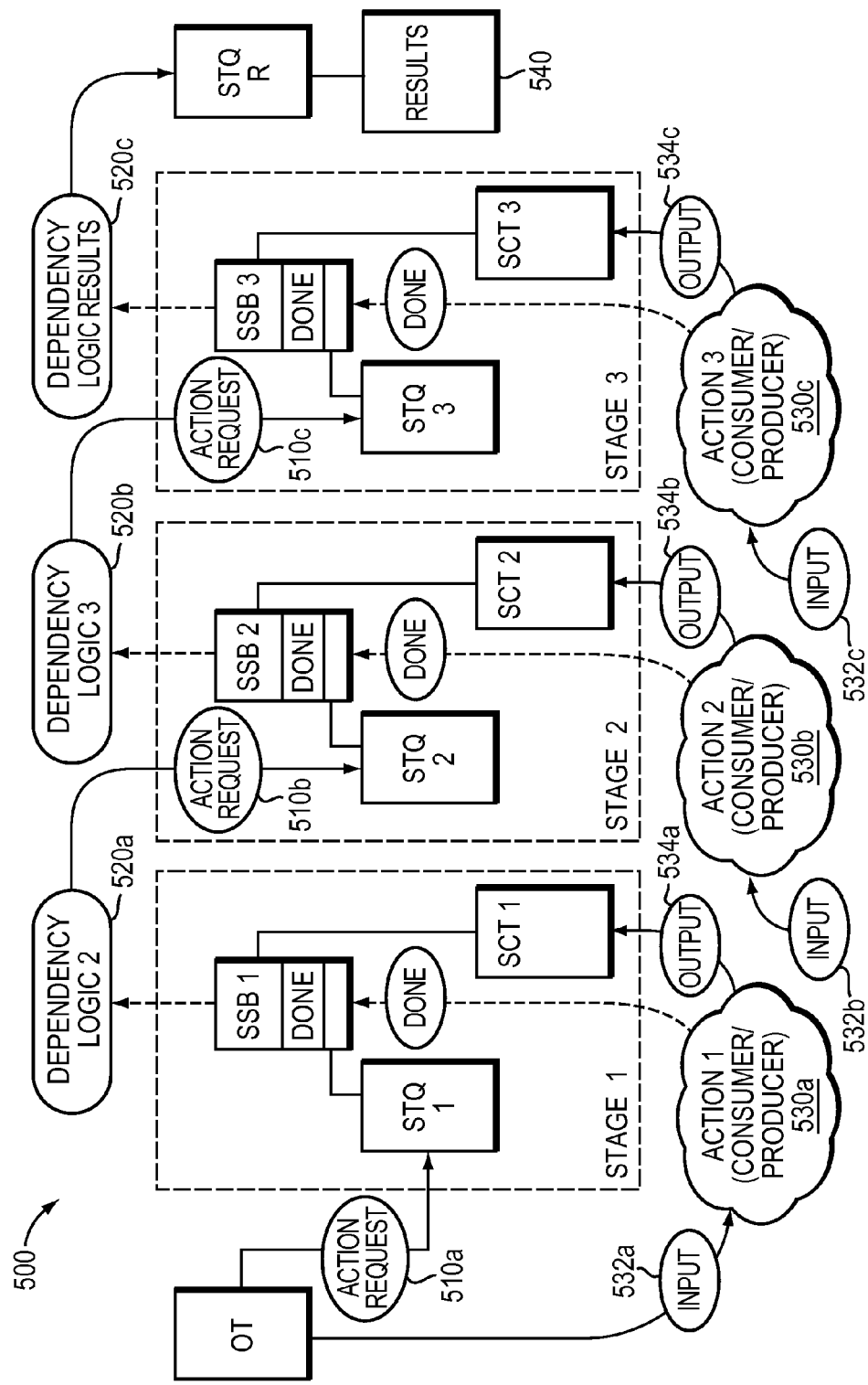
FIG. 5 is a block diagram of an exemplary modularized architecture of the analysis database that may be advantageously used with one or more embodiments described herein.

FIG. 5 is a block diagram of an exemplary modularized architecture 500 of the analysis database 400 that may be advantageously used with one or more embodiments described herein. The modularized architecture may organize the object table 420, state sub-blocks 430, state co-tables 440, and state transition queues 450 into vertical portions of the analysis database 400 to implement a state machine (e.g., a pipeline) having a plurality of stages. Illustratively, the state machine includes an initial object table (OT) stage and subsequent stages, each of which includes a state sub-block (SSB), a state co-table (SCT) and a state transition queue (STQ). The state machine may be configured to store the status or state of an object as it flows (i.e., transitions) through the state machine, including any changes to the state, during processing by the modules of the analysis engine 320. Accordingly, the modularized architecture 500 may be further organized such that each stage corresponds to a module of the analysis engine 320 operating on the object.

In an embodiment, the modularized architecture 500 may organize the analysis database 400 as a state machine configured for dependency processing of the object. For example, state sub-block 1 (SSB 1) may be configured to store constant metadata used to perform a first stage ("stage S1") of analysis (e.g., static analysis) by a module (e.g., the static analysis module 330). To transition from an initial state of the object at, i.e., the initial object table (OT) to stage S1, an action request 510a is inserted into a state transition queue (STQ 1) provided to stage 1. Upon completing its stage 1 of analysis (i.e., action), the static analysis module 330 may store the (output 534a) results of the analysis (i.e., object metadata) in state co-table (SCT 1) associated with the state sub-block SSB 1 of stage 1. In addition, the status 439 of SSB 1 may be set to, e.g., DONE, indicating that the action 1 is done. Notably the action (i.e., processing) performed by the module of each stage acts as a consumer of input 532 (i.e., information) and producer of output 534 (i.e., results). The analysis output (i.e., current stage output) may be used to start the next stage (stage 2) of analysis ("stage S2") when the dependency of stage 2 is satisfied via dependency logic 2. Accordingly, some of the object metadata (such as the time stamp) in the state co-table SCT 1 of stage 1 may be inserted as action request 510b into the next transition queue (e.g., STQ 2). Note that the stage output (i.e., analysis results) once generated remains as constant (unchanging) metadata.

In an embodiment, state sub-blocks SSB 2 and 3 of stages 2 and 3 may store constant metadata used to perform subsequent analysis (e.g., score generation and behavioral analysis) by respective modules (e.g., score generator module 340 and behavioral analysis module 350). Once processing of the respective stages of analysis completes (i.e., action 2 and action 3), (constant) results are stored in the associated state co-tables SCT 2 and 3. The state sub-blocks SSB 2 and 3 and their state co-tables SCT 2 and 3 contain constant, non-modifiable metadata, i.e., insert-only metadata. However, the state co-table SCT 2 of stage 2, for example, may contain results (metadata) needed (i.e., dependency) to start the next stage of analysis at state sub-block SSB 3 of stage 3. Accordingly, some of the information (object metadata) in the state co-table SCT 2 may be provided as input 532c to the action 3 of stage 3. As such, an action request 510c may be inserted into the state transition table STQ 3 when dependency logic 3 determines the dependency for stage 3 is satisfied. Notably, the dependency logic may be interrupt driven on completion of the prior stage or poll driven (e.g., periodic testing of dependency satisfaction). Note also that the dependency logic may be global such that it operates as a scheduler of the stages, e.g., waking at periodic intervals and determining which stages may "run" when their respective dependencies are satisfied.

The information stored in the state sub-blocks 430 and state co-tables 440 of the modularized architecture 500 represent constant information (e.g., object metadata) that is initially stored in-core (e.g., in memory 220) and thereafter persistently stored on-disk (e.g., in accordance with an on-disk database format on storage devices 216). In contrast, the information stored in the state transition queues represent fleeting data (metadata) that is temporarily stored and eventually deleted. Such fleeting information may include frequent updates (e.g., insertions and deletions) that may overwrite certain attributes of object stage metadata. Note, however that the updates do not occur at the state sub-blocks, and the co-tables, which are instead modified by the results of actions (i.e., object analysis).

As noted, the updates (e.g., insertions and deletions) to the analysis database 400 are illustratively directed to the state transition queues 450. The module performing a current stage of analysis may complete and cause dependency logic to trigger insertion of information into the next stage STQ. The module performing a next stage of analysis may dequeue (i.e., extract) information from the queue (once the stage of analysis for the object completes). Thus, unlike the prior approach of a highly-shared object cache, no global updating or locking mechanisms are required. That is, the dependency logic of each stage acts as a "single writer" inserting (i.e., enqueuing) information into the queue and the action of the stage acts as a "single reader" deleting (i.e., dequeuing) information from the queue. Output results from object analysis into the database of the modularized architecture may be distributed among stage co-tables, which stream information among the stages via reference (e.g., object ID) in the state transition queues for processing by the modules, resulting in consumer/producer interactions between only previous and current stages and their respective state sub-blocks, which is inherently "lock free". Although the updates may be similar to those that occur in the prior single table approach, the amount of metadata that is updated in the modularized architecture is reduced from the prior approach because, e.g. a full row of the single table is not updated; instead, only relatively small transition queues 450 are updated to denote state transitions. The reduced amount of metadata/updates is also easier to synchronize with the on-disk database.

Illustratively, the organization of each stage is the same across the analysis database 400, e.g., a state sub-block 430 receives information from its state transition queue 450 and the stage action 530a-c generates outputs 534a-c (i.e., results) that are stored in its associated state co-table 440, which then provides information for a next state transition queue 450 of a next stage. According to the modularized architecture, once processing dependencies are identified, the state transitions may be modified to handle parallel and/or sequential processing as needed. That is, the state machine of the modularized architecture may be configured with "loose-coupling" that obviates a requirement of sequential (pipeline) operation, i.e., each module may operate only on its object metadata stored in the state sub-block, independent of other modules and their object metadata. Such loose coupling facilitates efficient parallel processing performance within the overall operation. The processing flow of the analysis engine 320 may determine the organization of the modularized architecture; alternatively, the submitter 310 may choose a mode, e.g., sequential or parallel, for processing of the stages. In addition, a global job queue may be provided that constantly changes and manifests status of objects analyzed in the architecture by, e.g., indicating requests/jobs in flight/progress. Note that the global job queue is updated or constructed by the stored (database) procedures described above.

Figure 6:
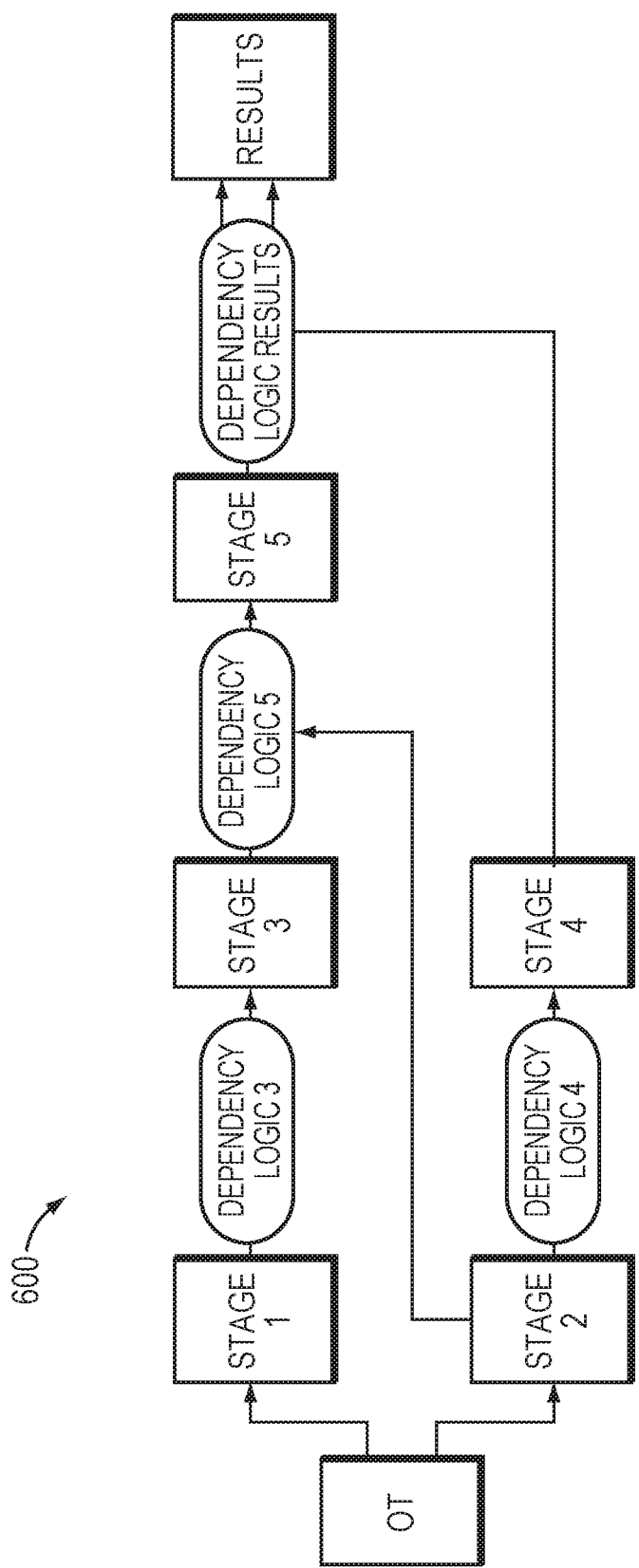
FIG. 6 is a block diagram of another exemplary modularized architecture of the analysis database that may be advantageously used with one or more embodiments described herein.

FIG. 6 is a block diagram of another exemplary modularized architecture 600 of the analysis database 400 that may be advantageously used with one or more embodiments described herein. In an embodiment, the modularized architecture 600 may organize the analysis database 400 as a state machine configured for parallel (and sequential) processing. The processing flow relating to analysis of an object within the state machine starts at the object block OT and proceeds, in parallel, to the data structures of stages 1 and 2. The processing flow then proceeds sequentially from stage 1 to stage 3 via dependency logic 3 and onto stage 5 via dependency logic 5 which may illustratively include a dependency on stage 2 as well as stage 3. The processing flow may also proceed sequentially from stage 2 to stage 4 while depending on results from stage 5 before continuing onto a final results stage. Returning briefly to the postal services example, a sorting action (stage 3) may occur in parallel to checking a size of a mail piece (stage 2) and a weight of the piece (stage 4); whereas a subsequent delivery action (results stage) may depend on the size and weight information from stages 2 and 4 before invoking the action, e.g., deliver via truck or by mail carrier.

Figure 7:
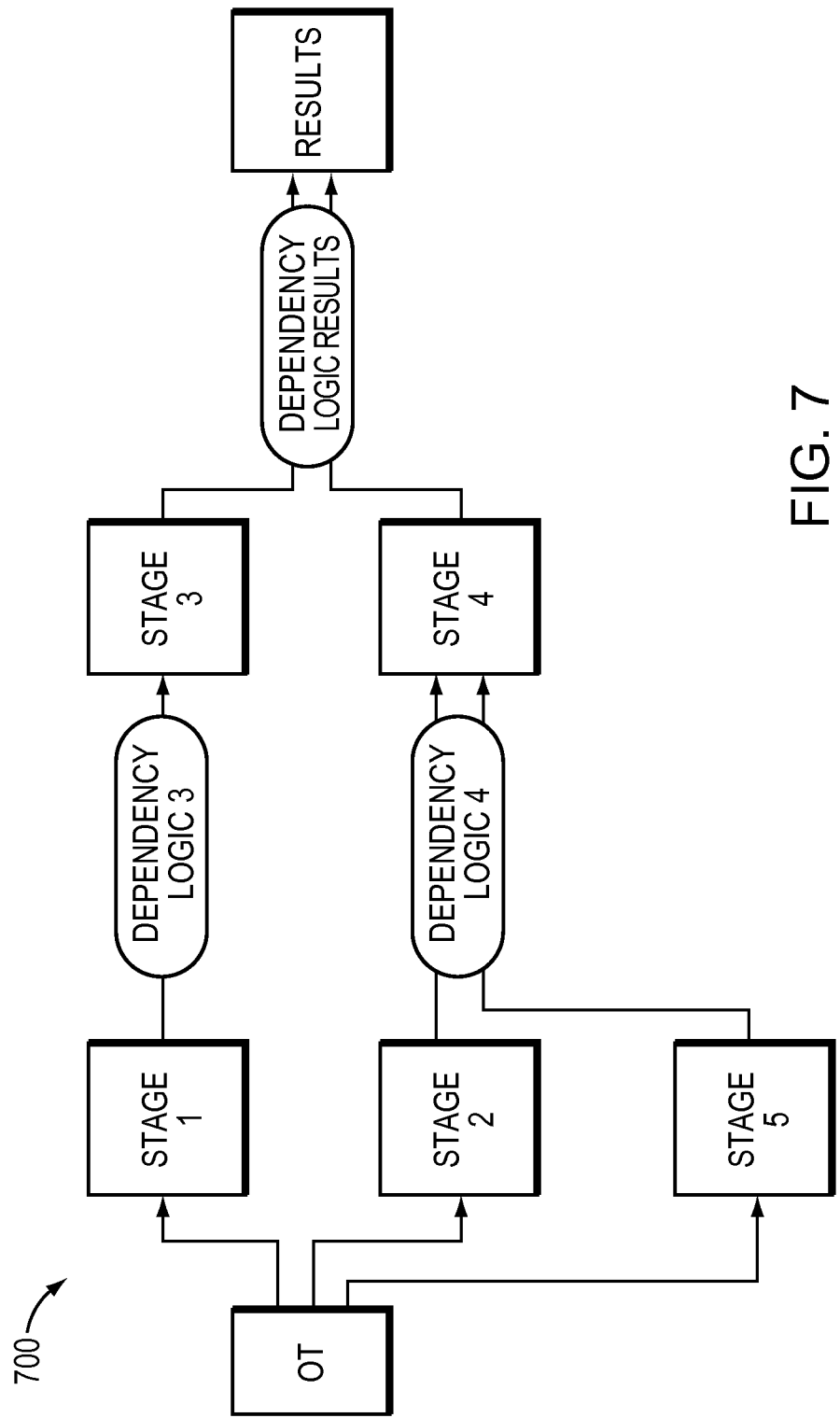
FIG. 7 is a block diagram of yet another exemplary modularized architecture of the analysis database that may be advantageously used with one or more embodiments described herein.

FIG. 7 is a block diagram of yet another exemplary modularized architecture 700 of the analysis database 400 that may be advantageously used with one or more embodiments described herein. In an embodiment, the modularized architecture 700 may modify the state machine of the analysis database to include an additional stage (e.g., stage 5). The additional stage may correspond to another module of the analysis engine 320 and may be added to the processing flow by, e.g., inserting data structures, such as state sub-block 430, state co-table 440 and state transition queue 450 of stage 5, between the object table (OT) and stage 4 (i.e., in parallel to stage 2). The existing stages (e.g., stages 1-3) and their associated data structures are not affected by the modification and continue to operate as intended. Only the object table (OT) and stage 4 (and the associated dependency logic 4) are impacted and need to adapt to the inserted stage 5.

Illustratively, the modularized architecture implements a database-driven state machine, where state transitions are recorded in the analysis database 400 to provide information of where the object is in the state machine at any time. Work (action) is performed by each module corresponding to a stage of the multi-stage architecture and consumers may read the output of that work. For example, a user interface of the MDS 200 may request the results (output) of the work or those results may be transferred to one or more nodes of the network environment 100. Unlike the prior approach where the consumers (and actions) contend for access to the single table (raising contention and locking issues), the modularized architecture isolates such consumer access to one or more stages. For example, if a consumer (and action) is interested in status, e.g., a number of requests, for static analysis, the inquiry may be directed to the appropriate state co-table 440 of the modularized architecture to access the results stored in that table. In essence, the modularized architecture of the analysis database replaces updates directed to the single large table with updates directed to relatively small STQ tables distributed among the state machine.

Figure 8:
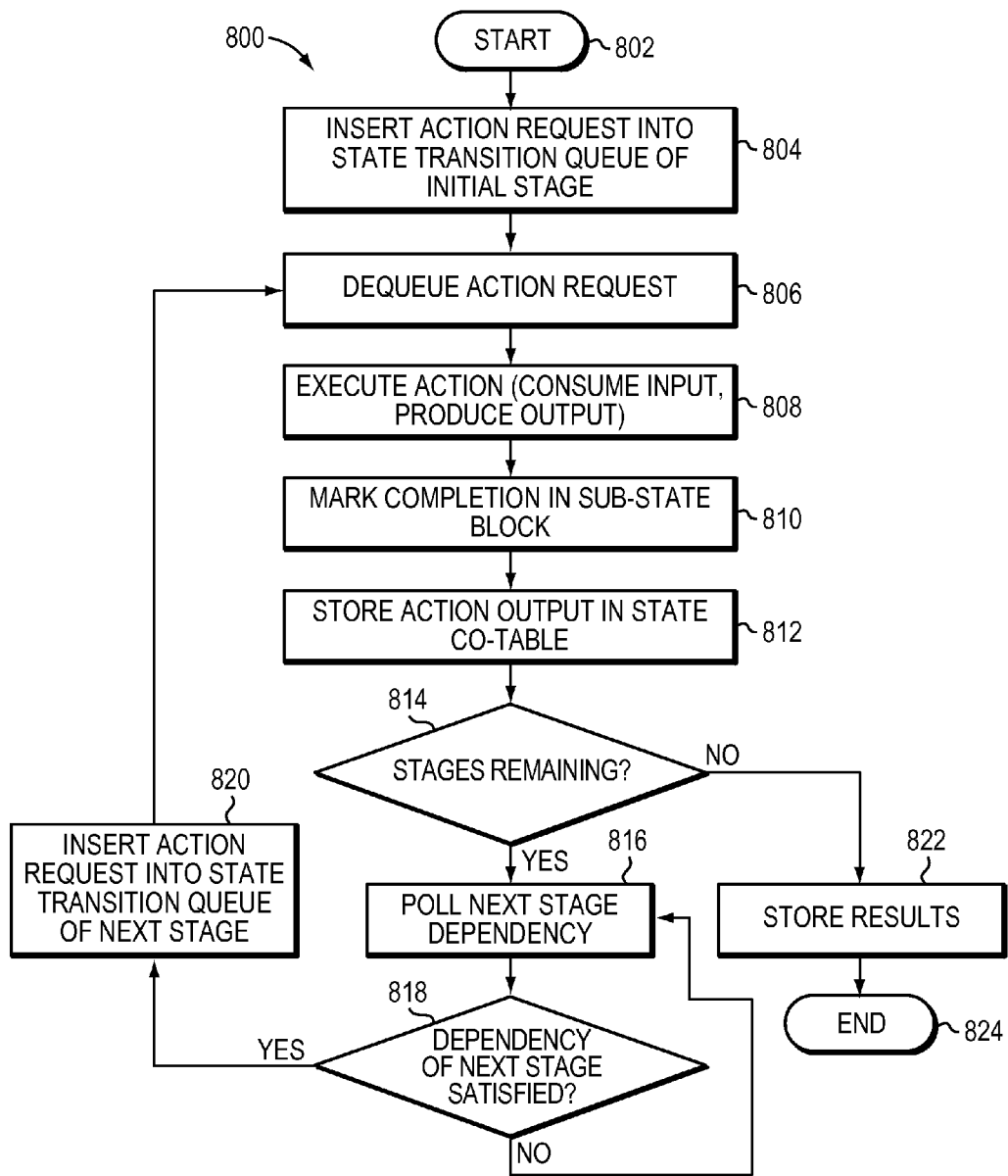
FIG. 8 is an exemplary simplified procedure for executing a state machine using the modularized architecture described herein.

FIG. 8 is an exemplary simplified procedure for executing the state machine using the modularized architecture described herein. The procedure 800 starts at step 802 and proceeds to step 804 where an action request is inserted into the state transition queue for one or more initial stages of the state machine. At step 806, the action request is dequeued and the action is executed (step 808) consuming an input and optionally producing an output. The output may be stored in the state co-table for the stage at step 812. The status may be set in the state sub-block in step 810 and at step 814, a determination is made as to whether any stages remain to be executed in the state machine. If not, the final results are stored and the procedure ends at step 824. If stages remain to be executed, the dependency for the next stage is polled at step 816. A determination is then made as to whether the dependency of the next stage is satisfied at step 818. If so, an action request is inserted into the state transition queue for the next stage at step 820. If not, the dependency is polled again. Note that the above procedure may be performed in parallel for those stages which may execute in parallel.

While there have been shown and described illustrative embodiments of a modularized architecture using vertical partitioning of an analysis database configured to store object metadata and processing results of one or more objects analyzed by an analysis engine (i.e., state machine) of a malware detection system, it is to be understood that various other adaptations and modifications may be made within the spirit and scope of the embodiments herein. For example, embodiments have been shown and described herein with relation to the organization of the modularized architecture as a multi-stage, state machine configured to store information (object metadata) processed by modules of the analysis engine. However, the embodiments in their broader sense are not so limited, and may, in fact, also allow for use of the modularized architecture for analytical and tracking dashboards. For instance, the number of objects analyzed by the analysis engine may be determined by counting object tables (e.g., master blocks), while the number of state transitions that have occurred for an object may be determined by counting sub-blocks and/or state co-tables, or by referencing the state transition queues. As such, it is expressly contemplated that the database architecture may include embodiments for any overall operation (including business operations) which may be implemented as a state machine.

Advantageously, the modularized architecture may organize the database using vertical partitioning to efficiently perform sequential and/or parallel processing within stages associated with the partitions in order to implement a state machine. To that end, the analysis database may be used as a "state transition engine" configured to store state transitions using small queues to maintain information and attributes throughout the stages. States of objects may be maintained in stages of sub-blocks and co-tables, wherein each stage is independent of other stages to thereby maintain progress of the state machine In sum, the modularized database architecture (i) reduces the size of update operations by replacing those operations with small queue insertions/deletions; (ii) provides full information of the analysis at each stage; (iii) allows flexible stage modification to adapt to stages of analysis; and (iv) distributes the update load of the database (versus single table) through the use of modularized queues having small sized changes (i.e., insertions/deletions).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein

What is claimed is:

1. A system comprising:
a memory connected to a processor; and
program code executing on the processor, the program code operable to:
configure a database to store object metadata of one or more objects processed by a state machine to generate processing results, the database including one or more object tables, state sub-block structures, state co-table structures, and state transition queue structures, the database vertically organized as a plurality of stages to implement the state machine, wherein each stage includes a state sub-block structure, a state co-table structure and a state transition queue structure, the database further organized such that each stage corresponds to a module of an analysis engine operating on an object, and wherein the module corresponding to each stage executes according to a dependency on the processing results.

2. The system of claim 1 wherein the module is configured to process the object metadata stored in the structures of a corresponding stage such that the state sub-block structure receives the object metadata from the state transition queue structure and the module generates the processing results that are stored in the state co-table structure.

3. The system of claim 2 wherein the state co-table structure is configured to provide a portion of the processing results to a next state transition queue structure of a next stage.

4. The system of claim 3 wherein dependency logic associated with each stage determines whether the dependency is satisfied.

5. The system of claim 4 wherein each object table comprises an initial state metadata having one of an object identifier and an object hash.

6. The system of claim 4 wherein each state sub-block structure is configured to store a status of the processing results of the stage for processing by the corresponding module of the analysis engine.

7. The system of claim 6 wherein the object metadata comprises one of a start timestamp, an end timestamp and the status.

8. The system of claim 6 wherein each state co-table structure is configured to store results of the processing by the corresponding module.

9. The system of claim 8 wherein the results comprise analytical information associated with the object observed at an associated state.

10. The system of claim 8 wherein each state transition queue structure is configured to store updates for transitioning between the stages.

11. The system of claim 10 wherein each state transition queue structure is further configured to manipulate entries within the queue structure to insert into the state sub-block structure.

12. A method comprising:
organizing an analysis database as a state machine having a plurality of stages, wherein each stage includes a state sub-block structure, a state co-table structure and a state transition queue structure;
storing object metadata and processing results of an object in the analysis database, the object metadata processed by an analysis engine of a node having a processor to generate the processing results; and
processing, at the node, the object metadata stored in the structures of a stage such that a state sub-block structure receives the object metadata from a state transition queue and provides the processing results for storage in the state co-table.

13. The method of claim 12 further comprising forwarding a portion of the processing results to a next stage.

14. The method of claim 12 wherein the analysis database is organized such that each stage corresponds to a module of the analysis engine operating on the object and wherein the module of each stage executes according to a dependency on the processing results.

15. The method of claim 14 further comprising:
determining whether the dependency is satisfied; and
in response to determining that the dependency is satisfied, invoking the analysis engine to perform a next stage by inserting an action request into the state transition queue of the next stage.

16. The method of claim 14 wherein organizing the analysis database further comprises configuring the state sub-block structure to store a status of processing by a corresponding module of the analysis engine.

17. The method of claim 16 wherein organizing the analysis database further comprises configuring the state transition queue structure to store updates for transitioning between the stages.

18. The method of claim 17 wherein the state transition queue structure is configured to manipulate entries stored in the state transition queue structure to insert into the state sub-block structure.

19. The method of claim 14 wherein organizing the analysis database further comprises configuring the state co-table structure such that the processing results stored in the state co-table may be accessible by reference from the analysis database.

20. A non-transitory computer readable medium containing instructions for execution on a processor for a method comprising:
organizing an analysis database of a node including the processor as a state machine having a plurality of stages, wherein each stage includes a state sub-block structure, a state co-table structure and a state transition queue structure, and wherein each stage corresponds to a module of an analysis engine operating on an object;
storing object metadata and processing results of the object in the analysis database, the object metadata processed by the analysis engine to generate the processing results; and
processing the object metadata stored in the structures of a stage such that a state sub-block structure receives the object metadata from a state transition queue.

* * * * *